United States Patent
Drabon et al.

(10) Patent No.: US 6,913,273 B2
(45) Date of Patent: Jul. 5, 2005

(54) CONTROL ARM, AND METHOD OF MAKING A CONTROL ARM

(75) Inventors: Rodscha Drabon, Paderborn (DE);
Leonhard Rose, Borchen (DE);
Hendrik Korinth, Paderborn (DE);
Hans-Jürgen Neumann, Bielefeld (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 222 days.

(21) Appl. No.: 10/310,654

(22) Filed: Dec. 5, 2002

(65) Prior Publication Data

US 2003/0122339 A1 Jul. 3, 2003

(30) Foreign Application Priority Data

Dec. 5, 2001 (DE) ............................................ 101 59 524
Nov. 26, 2002 (DE) ............................................ 102 55 049

(51) Int. Cl.⁷ ............................................................. B62D 7/16
(52) U.S. Cl. ................. 280/93.502; 29/592; 280/93.51; 280/124.134
(58) Field of Search .......................... 280/93.502, 93.51, 280/124.134; 29/592

(56) References Cited

U.S. PATENT DOCUMENTS 5,901,972 A * 5/1999 Watanabe et al. ...... 280/124.152
6,311,996 B1 * 11/2001 Kato et al. ............. 280/124.134
2003/0160414 A1 * 8/2003 Pincerato et al. ........ 280/93.51

FOREIGN PATENT DOCUMENTS

DE 199 11 121 A1 9/1999

* cited by examiner

Primary Examiner—Eric Culbreth
(74) Attorney, Agent, or Firm—Henry M. Feiereisen

(57) ABSTRACT

A control arm includes a connection tube and two mounting eyes respectively attached to opposite ends of the tube. Each mounting eye has a sleeve and a rubber-metal element vulcanized into the sleeve. In a method of making such a control arm, an elongate tubular member is sized to a sleeve blank of a length commensurate with the tube. Parallel thereto, an extruded profile is made with a cross sectional configuration of the sleeve and subsequently sized to the axial height of the sleeve. Rubber-metal elements are vulcanized into the sleeve blanks which together with the tube are then clamped, axially shiftable, in a friction welding machine for subsequently fabricating protruding collars on the sleeves through material removal and joining the end surfaces of the protruding collars with the end surfaces of the tube. While still clamped, the tube and the mounting eyes are calibrated through cold upsetting and the joints are smoothed.

15 Claims, 3 Drawing Sheets

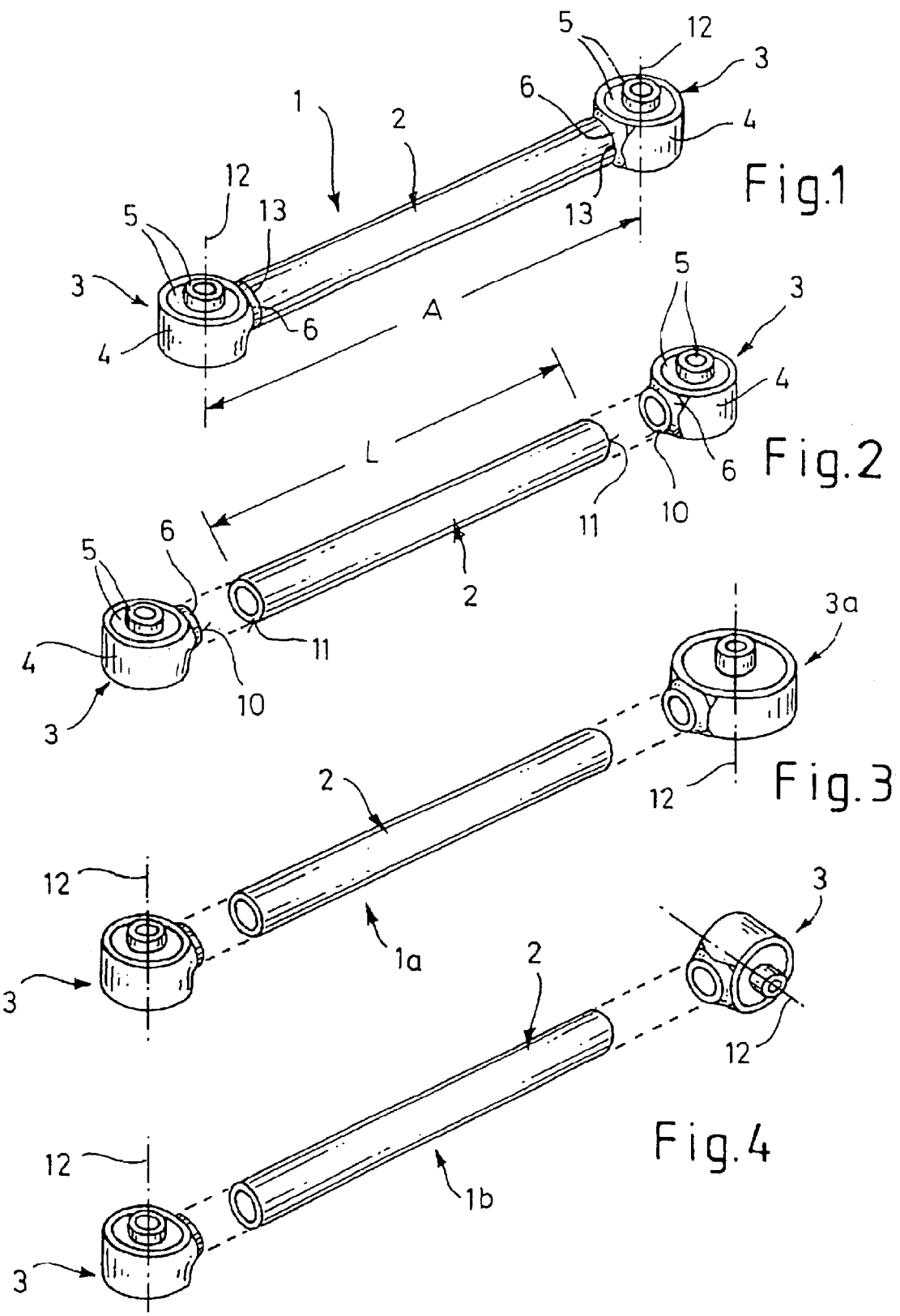

CONTROL ARM, AND METHOD OF MAKING A CONTROL ARM

CROSS-REFERENCES TO RELATED APPLICATIONS

This application claims the priority of German Patent Applications, Serial Nos. 101 59 524.7, filed Dec. 5, 2001, and 102 55 049.2, filed Nov. 26, 2002, pursuant to 35 U.S.C. 119(a)–(d), the disclosure of which is incorporated herein by reference.

BACKGROUND OF THE INVENTION

The present invention relates, in general, to a control arm, and to a method of making such a control arm, in particular for use in an undercarriage of a motor vehicle.

German patent publication DE 199 11 121 A1 describes a control arm for use in the undercarriage of a motor vehicle. The control arm includes a connection tube made of an aluminum alloy and having opposite ends formed with mounting eyes. Each mounting eye is composed of a sleeve, which is made of an aluminum alloy and formed with a protruding collar, and a bearing element, which is embedded in the sleeve. The bearing element is made as metallic bushing which includes a rubber element and is press-fitted into a receiving hole of the sleeve.

Press-fitting constitutes a rather complicated and time-consuming process. The metallic bushing has to be precisely secured in place in order to enable a reliable attachment of an undercarriage component. The fabrication of bearing elements is a separate process, whereby a pre-fabricated bearing element includes at least one inner bushing which is encased by a rubber layer. As alternative, several bushings with interposed rubber layers may be provided in such a bearing element. An outer bushing of metal or plastic then surrounds the inner layers. After fabrication, the bearing element is calibrated in the sleeve by a separate step or during the press-fitting process. The inner surface of the receiving hole in the sleeve as well as the outer bushing of the bearing element must have precise tolerances to allow subsequent press-fitting of the bearing element into the sleeve and to realize certain pushing forces. A required pushing force must be defined and maintained to ensure reliability of the press-fit under any occurring forces and environmental conditions over the entire service life.

The conventional control arm suffers many shortcomings. Control arms of aluminum are generally more complex in structure than control arms made of steel. Press-fitting constitutes an additional separate working step. Moreover, the press-fit must have sufficient protection against corrosion under any environmental conditions. Also, the provision of an outer bushing for the bearing element increases the weight of the mounting eye. As a consequence, there is an increase of unsprung masses in an axle system. This may adversely affect the driving comfort of a motor vehicle. The protruding collars of the sleeves of the conventional control arm are made of solid material and engage into the connection tube. Joining between the protruding collars and the connection tube is implemented through a friction stir welding process. This welding process is fairly complicated, when round parts are involved. Moreover, friction stir welding has deficiencies relating to the presence of a hole at the end of the welding process, when the pin-shaped probe is removed. This hole is exposed to increased corrosive stress and significant notch effect, when the control arm is used in an undercarriage. As a consequence, the service life of the control arm is adversely affected.

It is also known to use friction welding for joining a tube to a blunt surface of a block-like or parallelepiped member. However, connection of a thin-walled tube to a large-area block surface poses many problems and results in a significantly increased notch effect. Thus, the life of such a connection is limited so that this type of connection is effectively unsuitable for use in chassis engineering, and moreover the overall weight of the component is also increased.

It would therefore be desirable and advantageous to provide an improved control arm, and method of making such a control arm, to obviate prior art shortcomings and to enable an economical large scale production which results in a smaller weight and yet reliable operation of the control arm.

SUMMARY OF THE INVENTION

According to one aspect of the present invention, a method of making a control arm, in particular for an undercarriage of a motor vehicle, with the control arm having a connection tube provided on opposite ends with mounting eyes, each mounting eye including a sleeve, which has a protruding collar, and a bearing element, which is embedded in the sleeve, includes the steps of sizing an elongate tubular member of circular cross section to a length plus overmeasure of a connection tube of a control arm, forming through extrusion or extrusion pressing a profile of a cross sectional configuration in accordance with a sleeve of the control arm, dividing the profile to form sleeve blanks which are each configured at an axial height commensurate with a height of the sleeve and include a protrusion, vulcanizing bearing elements in the form of rubber-metal elements into the sleeve blanks, clamping in an axially shiftable manner the sleeve blanks and the tubular member in a friction welding machine, machining the protrusion of the sleeve blanks to form a protruding collar with circular ring shaped end surface; friction welding the end surface of the sleeve blanks to circular ring shaped end surfaces of the tubular member, calibrating the joined sleeve blanks and the tubular member at their joints through cold upsetting, and smoothing the joints about their circumference.

The present invention resolves prior art problems by taking into consideration that the control arm with terminal mounting eyes constitutes a typical mass product, and by suiting the production steps to such a mass article. Thus, on one hand, the tubular member is sized to the length of the connection tube plus overmeasure for the subsequent joining process. The tubular member may hereby be made of a light metal alloy or plastic, in particular through an extrusion process. Of course, the tubular member may also be made of curved and longitudinally welded blanks, e.g. through laser welding or high-frequency induction welding. In addition, a profile is made through extrusion or extrusion pressing with a cross sectional configuration that is commensurate with a configuration of the sleeve with protruding collar, and subsequently sized to the axial height of the sleeve with protruding collar. Sizing may be realized, e.g., by sawing. The profile may also be made of light metal alloys or plastic.

Currently preferred is a fabrication of the tubular member and/or sleeve of an aluminum alloy containing, by weight percent, Si 0.59–0.81%, Mn 0.28–0.38%, Mg 0.22–0.30%, Fe 0.16–0.22%, the balance Al and incidental impurities during fusion welding. The use of aluminum alloy is advantageous because of the absence of any thermal after-treatments. Suitably, the tubular member and/or the sleeve blank may be made-of an aluminum alloy containing, by weight percent, Si 0.69%, Mn 0.33%, Mg 0.26%, Fe 0.20%, the balance Al and incidental impurities during fusion welding.

As a consequence of these fabrication steps, a total of three separate components is produced, namely, a connection tube and two sleeve blanks.

A bearing element in the form of a rubber-metal element is vulcanized into each of the sleeve blanks. In this way, the weight of the mounting eye and the resultant control arm is significantly reduced because the need for providing a separate bushing is eliminated. Also, the sleeves as well as the rubber-metal bearing elements may have any desired cross section. Round or polygonal cross sections are conceivable. In addition, the size of the sleeves may be varied. The axes of the rubber-metal elements may be oriented in the sleeves in parallel relationship or at an angle. Once the rubber-metal element is vulcanized into the sleeve blank, this unitary structure can be calibrated, if required. Vulcanizing of the bearing elements in the sleeve blanks results in an optimum positional fixation and absorption of high axial forces.

After vulcanization of the bearing elements into the sleeve blanks, preferably two of the sleeve blanks and a connection tube are clamped in a friction welding machine and the protruding collars are shaped by a material removing process, e.g., turning or milling. It will be understood by persons skilled in the art that the terms "machining" and "material removing process" are used synonymous in the disclosure.

As a consequence of the fixed positioning of the connection tube and the mounting eyes during friction welding only little heat is introduced into sleeve blanks with vulcanized rubber-metal elements. Thus, damage to the rubber-metal elements is prevented, while realizing a homogenous fine-grained joint. The need for a press-fitting securement of rubber-metal elements is eliminated in view of their direct vulcanization into the sleeve blanks. Also, there is no need for any after-treatments, as required in prior art approaches that involve precise finishing steps of inner surfaces of the sleeve blanks as well as outer surface of bushings of separately produced rubber-metal bearings to provide precise tolerances during press-fitting. The absence of any bushings not only reduces weight but eliminates working steps to thereby reduce the fabrication costs.

Calibration through cold upsetting of joined components ensures precisely defined distance tolerance between the axes of the rubber-metal elements. Subsequently, the joints can be smoothed circumferentially, e.g. by a material removing process or rolling process.

Since the connection tube and the sleeve blanks are held in a single restraint during treatment, welding and, optional, calibration, the control arm can be produced not only in a precise and accurate manner for use in an undercarriage of a motor vehicle but can be produced on a large scale with reproducible results. Any possibility of misalignment is eliminated.

According to another aspect of the present invention, a method of making a control arm, in particular for an undercarriage of a motor vehicle, with the control arm having a connection tube provided on opposite ends with mounting eyes, each mounting eye including a sleeve, which has a protruding collar, and a bearing element, which is embedded in the sleeve, with the method including the steps of sizing a tubular member of circular cross section to a length plus overmeasure of a connection tube of a finished control arm, forming through extrusion or extrusion pressing a profile of a cross sectional configuration in accordance with a sleeve of the control arm, dividing the profile to form sleeve blanks which are each configured at an axial height commensurate with a height of the sleeve and include a protrusion, machining the protrusion of the sleeve blanks to form a protruding collar with a circular ring shaped end surface; vulcanizing bearing elements in the form of rubber-metal elements into the sleeve blanks to form mounting eyes, clamping in an axially shiftable manner the mounting eyes and the tubular member in a friction welding machine, friction welding the end surface of the protruding collars to circular ring shaped end surfaces of the tubular member, calibrating the joined protruding collars and the tubular member at their joints through cold upsetting, and smoothing the joints about their circumference.

This variation of the production method differs from the previously described process variation in that the protruding collar may be fabricated upon a sleeve either outside of or in a friction welding machine. Vulcanization of the rubber-metal elements into the sleeves is realized outside of the friction welding machine. The protruding collar may be made before or after the vulcanization step.

According to still another aspect of the present invention, a control arm includes a connection tube having opposite end surfaces of circular ring shaped configuration, a pair of mounting eyes, each of the mounting eyes including a sleeve having a protruding collar which has a circular ring shaped end surface, wherein the end surface of the protruding collar of one sleeve is joined by a friction welding process to one end surface of the connection tube, and the end surface of the protruding collar of the other sleeve is joined by a friction welding process to the other end surface of the connection tube, and a pair of rubber-metal elements, one rubber-metal element vulcanized into one sleeve, and the other rubber-metal element vulcanized into the other sleeve.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a perspective view of a first embodiment of a control arm according to the present invention for use in an undercarriage of a motor vehicle;

FIG. 2 is an exploded view of the control arm of FIG. 1;

FIG. 3 is an exploded view of a second embodiment of a control arm according to the present invention;

FIG. 4 is an exploded view of a third embodiment of a control arm according to the present invention;

DETAILED DESCRIPTION OF PREFERRED EMBODIMENTS

Figure 5:
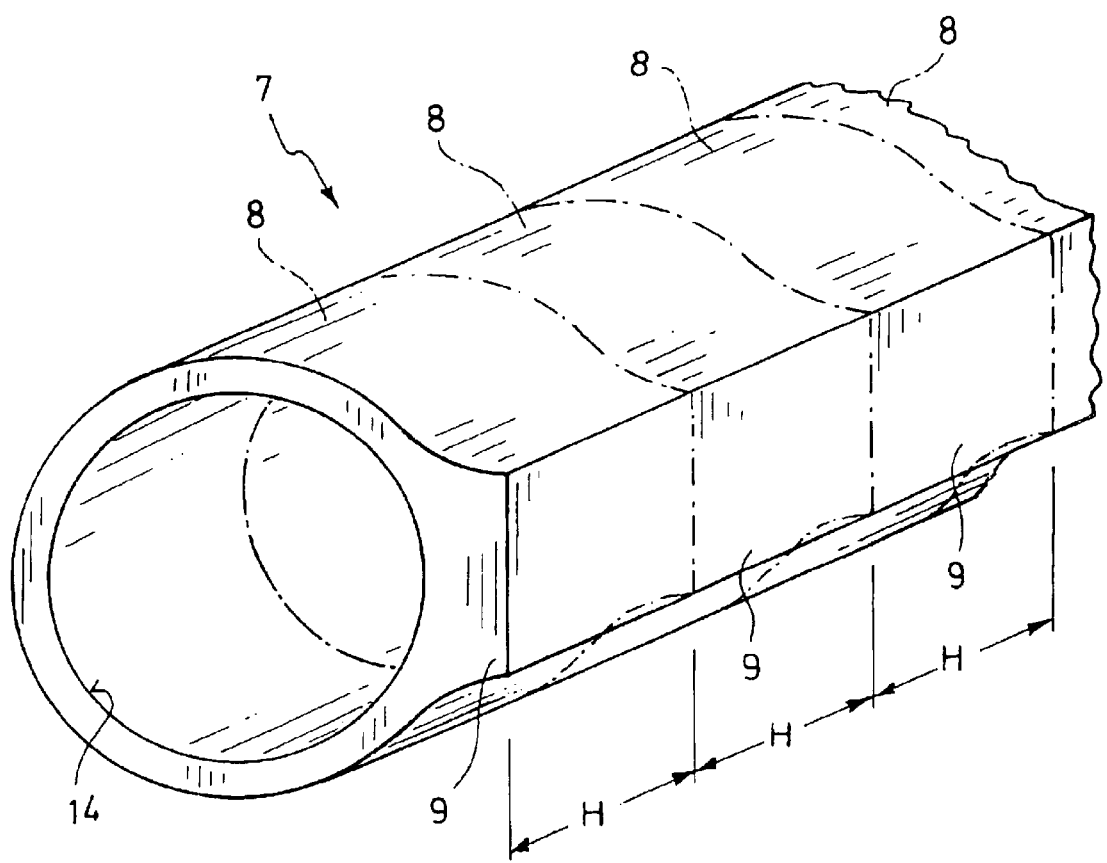
FIG. 5 is a perspective illustration of an extrusion profile for making sleeves for a control arm according to the present invention.

Throughout all the Figures, same or corresponding elements are generally indicated by same reference numerals.

These depicted embodiments are to be understood as illustrative of the invention and not as limiting in any way.

Turning now to the drawing, and in particular to FIG. 1, there is shown a perspective view of a first embodiment of a control arm according to the present invention, generally designated by reference numeral 1, for use in an undercarriage of a motor vehicle. The control arm 1 includes a straight connection tube 2 made of light metal alloy or plastic. Currently preferred is an aluminum alloy containing, by weight percent, Si 0.59–0.81%, Mn 0.28–0.38%, Mg 0.22–0.30%, Fe 0.16–0.22%, the balance Al and incidental impurities during fusion welding. A particular example of an aluminum alloy includes, by weight percent, Si 0.69%, Mn 0.33%, Mg 0.26%, Fe 0.20%, the balance Al and incidental impurities during fusion welding.

The connection tube 2 has opposite ends, each end joined by friction welding to a mounting eye, generally designated by reference numeral 3. Each mounting eye 3 includes a sleeve 4, which is provided with a protruding collar 6, and a rubber-metal element 5 which is vulcanized into the sleeve 4. The sleeve 4 can be made of light metal alloy or plastic. Suitably, the sleeve 4 is also made of an aluminum alloy which contains, by weight percent, Si 0.69%, Mn 0.33%, Mg 0.26%, Fe 0.20%, the balance Al and incidental impurities during fusion welding. A particular example of an aluminum alloy for the sleeve 4 includes, by weight percent, Si 0.69%, Mn 0.33%, Mg 0.26%, Fe 0.20%, the balance Al and incidental impurities during fusion welding.

The control arm of FIG. 1 is made as follows: A strand of tubular member of aluminum alloy is extruded and subsequently sized to a length L with slight overmeasure of a connection tube 2 (FIG. 2). Parallel thereto, a profile shown in FIG. 5 and generally designated by reference numeral 7 is extruded or extrusion pressed with a cross sectional configuration in accordance with the cross sectional configuration of a sleeve 4. The profile 7 may be made of light alloy or plastic. Suitably, the extrusion profile 7 may be made of an aluminum alloy which contains, by weight percent, Si 0.69%, Mn 0.33%, Mg 0.26%, Fe 0.20%, the balance Al and incidental impurities during fusion welding. A particular example of an aluminum alloy for the profile 7 includes, by weight percent, Si 0.69%, Mn 0.33%, Mg 0.26%, Fe 0.20%, the balance Al and incidental impurities during fusion welding.

Figure 6:
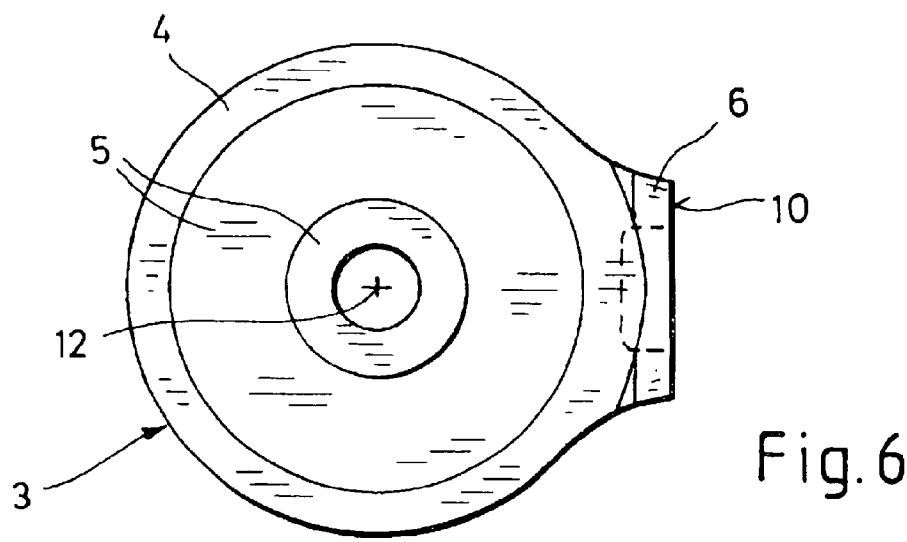
FIG. 6 is a top elevation of a mounting eye of the control arm of FIG. 1.
Figure 7:
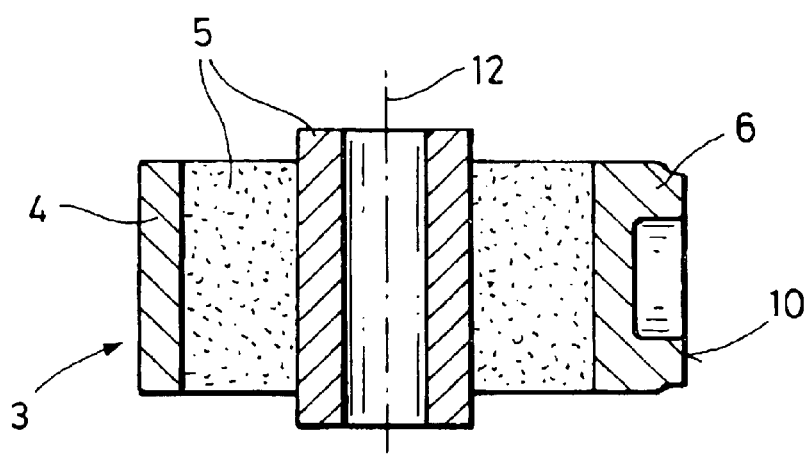
FIG. 7 is a vertical longitudinal section of the mounting eye of FIG. 6.

Subsequently, the extrusion profile 7 is then divided in segments commensurate with an axial height H of the sleeves 4, as indicated by dash-dot lines in FIG. 5, to produce respective sleeve blanks 8, each of which having a bore 14 and a protrusion 9. After cutting the profile 7 to size, the thus-formed sleeve blanks 8 can be provided with rubber-metal elements 5 which are respectively vulcanized into receiving holes 14 of the sleeve blanks 8. Two sleeve blanks 8, into which the rubber-metal elements 5 are vulcanized, and a connection tube 2 are clamped and restrained in a friction welding machine (not shown). As the sleeve blanks 8 and the connection tube 2 are fixed in place, the protrusions 9 of the sleeve blanks 8 are shaped through a material removing process into the protruding collars 6, as shown in FIGS. 6 and 7, to thereby realize the mounting eyes 3.

In a next step, the circular ring shaped end surfaces 10 of the protruding collars 6 of the sleeves 4 are joined to the circular ring shaped end surfaces 11 of the connection tube 2 through a friction welding process. The end surfaces 10 of the protruding collars 6 have an outer diameter which is precisely matched to the outer diameter of the end surfaces 11 of the connection tube 2.

After being joined, while still being restrained in the friction welding machine, the mounting eyes 3 and the connection tube 2 are subjected to a calibrating axial cold upsetting to establish a precise distance A between the axes 12 of the rubber-metal elements 5 (FIG. 1). While still being restrained in the friction welding machine, the joints 13 between the mounting eyes 3 and the connection tube 2 are smoothed about their circumference, e.g. by a material removing process or rolling process.

FIG. 3 shows an exploded view of a second embodiment of a control arm according to the present invention, generally designated by reference numeral 1a. Parts corresponding with those in FIG. 1 are denoted by identical reference numerals and not explained again. In this embodiment, the control arm 1a is provided with mounting eyes 3, 3a of different size, whereby the axes 12 of the mounting eyes 3, 3a are oriented in parallel relationship. Production and joining of the individual components of the control arm 1a correspond to the production and joining as described in connection with FIGS. 1 and 2, so that a further description thereof is omitted for the sake of simplicity.

FIG. 4 is an exploded view of a third embodiment of a control arm according to the present invention, generally designated by reference numeral 1b. Parts corresponding with those in FIG. 1 are denoted by identical reference numerals and not explained again. In this embodiment, the control arm 1b is provided with mounting eyes 3 of same size and having axes 12 which are offset to one another by 90°, i.e. they are oriented perpendicular to one another. Production and joining of the individual components of the control arm 1b correspond to the production and joining as described in connection with FIGS. 1 and 2, so that a further description thereof is omitted for the sake of simplicity.

Figure 8:
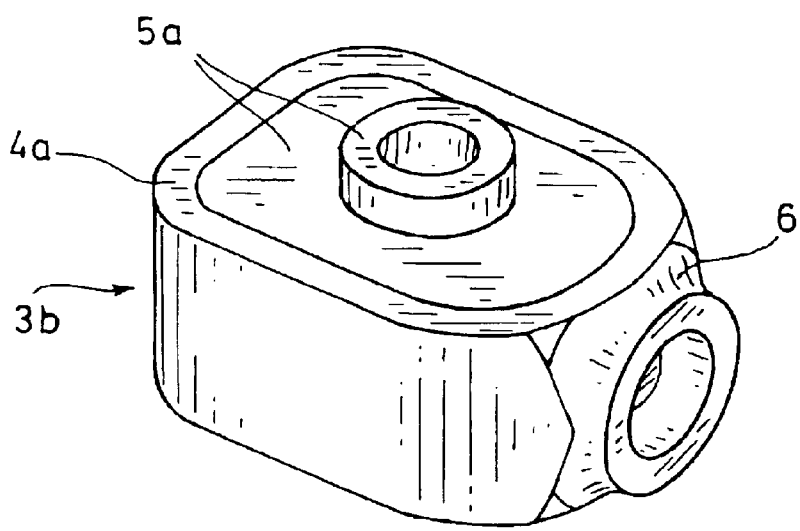
FIG. 8 is a perspective illustration of a mounting eye of a fourth embodiment of a control arm according to the present invention.

Turning now to FIG. 8, there is shown a perspective illustration of a mounting eye 3b which, unlike the mounting eyes 3, 3a, has an oval or approximate rectangular configuration. The advantage hereby is the fact that any desired cross section can be made in the profile and vulcanized subsequently. Thus, the rubber stiffness can be modified. The sleeve blank for the mounting eye 3b is also produced from a respectively configured extrusion profile and subsequently provided with a rubber-metal element 5a vulcanized therein. As the further process steps correspond to the previously described steps to fabricate sleeves 4a with protruding collars 6, a further description thereof is omitted for the sake of simplicity.

Of course, it is also conceivable to provide the sleeve blanks 8, cut to size from an extrusion profile 7 of correspondingly configured cross section, with the protrusions 6 in a separate fabrication step and to vulcanize the rubber-metal elements 5 either into the sleeve blank 8 or subsequently into the sleeves 4. Thereafter, the finished mounting eyes 3, 3a, 3b, are joined in a manner as described above with the connection tube 2.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A method of making a control arm, with the control arm having a connection tube provided on opposite ends with mounting eyes, each mounting eye including a sleeve, which has a protruding collar, and a bearing element, which is embedded in the sleeve, said method comprising the steps of:
   sizing an elongate tubular member of circular cross section to a length plus overmeasure of a connection tube of a control arm;
   forming through extrusion a profile of a cross sectional configuration in accordance with a sleeve of the control arm;
   dividing the profile to form sleeve blanks which are each configured at an axial height commensurate with a height of the sleeve and include a protrusion;
   vulcanizing bearing elements in the form of rubber-metal elements into the sleeve blanks;
   clamping in an axially shiftable manner the sleeve blanks and the tubular member in a friction welding machine;
   machining the protrusion of the sleeve blanks to form a protruding collar with circular ring shaped end surface;
   friction welding the end surface of the sleeve blanks to circular ring shaped end surfaces of the tubular member;
   calibrating the joined sleeve blanks and the tubular member at their joints through cold upsetting; and
   smoothing the joints about their circumference.

2. The method of claim 1, wherein the tubular member is made of a light metal alloy or plastic.

3. The method of claim 1, wherein the tubular member is made through extrusion.

4. The method of claim 1, wherein the tubular member is made from a curved and longitudinally welded plate.

5. The method of claim 1, wherein at least one of the tubular member and the profile is made of an aluminum alloy containing, by weight percent,

| | |
|---|---|
| Si | 0.59–0.81% |
| Mn | 0.28–0.38% |
| Mg | 0.22–0.30% |
| Fe | 0.16–0.22% | the balance Al and incidental impurities during fusion welding.

6. The method of claim 1, wherein at least one of the tubular member and the profile is made of an aluminum alloy containing, by weight percent,

| | |
|---|---|
| Si | 0.69% |
| Mn | 0.33% |
| Mg | 0.26% |
| Fe | 0.20% | the balance Al and incidental impurities during fusion welding.

7. The method of claim 1, wherein the dividing step is implemented by sawing.

8. The method of claim 1, wherein the machining step is a process selected from the group consisting of turning and milling.

9. The method of claim 1, wherein the calibrating step is a process selected from the group consisting of a material removing process and rolling process.

10. The method of claim 1, wherein the forming step through extrusion includes extrusion pressing.

11. A method of making a control arm, with the control arm having a connection tube provided on opposite ends with mounting eyes, each mounting eye including a sleeve, which has a protruding collar, and a bearing element, which is embedded in the sleeve, said method comprising the steps of:
   sizing a tubular member of circular cross section to a length plus overmeasure of a connection tube of a finished control arm;
   forming through extrusion or extrusion pressing a profile of a cross sectional configuration in accordance with a sleeve of the control arm;
   dividing the profile to form sleeve blanks which are each configured at an axial height commensurate with a height of the sleeve and include a protrusion;
   machining the protrusion of the sleeve blanks to form a protruding collar with a circular ring shaped end surface;
   vulcanizing bearing elements in the form of rubber-metal elements into the sized sleeve blanks to form mounting eyes;
   clamping in an axially shiftable manner the mounting eyes and the tubular member in a friction welding machine;
   welding by friction the end surface of the protruding collars to circular ring shaped end surfaces of the tubular member;
   calibrating the joined protruding collars and the tubular member at their joints through cold upsetting; and
   smoothing the joints about their circumference.

12. The method of claim 11, wherein at least one of the tubular member and the profile is made of an aluminum alloy containing, by weight percent,

| | |
|---|---|
| Si | 0.59–0.81% |
| Mn | 0.28–0.38% |
| Mg | 0.22–0.30% |
| Fe | 0.16–0.22% | the balance Al and incidental impurities during fusion welding.

13. The method of claim 11, wherein at least one of the tubular member and the profile is made of an aluminum alloy containing, by weight percent,

| | |
|---|---|
| Si | 0.69% |
| Mn | 0.33% |
| Mg | 0.26% |
| Fe | 0.20% | the balance Al and incidental impurities during fusion welding.

14. A method of making a control arm, comprising the steps of:
   extruding an elongate tubular member of circular cross section with opposite circular ring shaped end faces;
   dividing an extruded tubular profile to form a plurality of sleeve blanks, each formed with a protrusion;

vulcanizing a rubber-metal element into the sleeve blanks;

clamping two sleeve blanks and the tubular member in a friction welding machine;

machining the protrusion of the sleeve blanks to form a protruding collar with circular ring shaped end surface; and friction welding the end surface of one sleeve blank to one circular ring shaped end surface of the tubular member and friction welding the end surface of the other sleeve blank to the other circular ring shaped end surface of the tubular member.

15. A method of making a control arm, comprising the steps of:

extruding an elongate tubular member of circular cross section with opposite circular ring shaped end faces, dividing an extruded tubular profile to form a plurality of sleeve blanks, each formed with a lateral protrusion;

machining the protrusion of the sleeve blanks to form a protruding collar with circular ring shaped end surface vulcanizing a rubber-metal element into the sleeve blanks;

clamping two sleeve blanks and the tubular member in a friction welding machine; and friction welding the end surface of one sleeve blank to one circular ring shaped end surface of the tubular member and friction welding the end surface of the other sleeve blank to the other circular ring shaped end surface of the tubular member.

\* \* \* \* \*